United States Patent
Shin

(10) Patent No.: US 12,509,047 B2
(45) Date of Patent: Dec. 30, 2025

(54) VEHICLE BRAKE APPARATUS

(71) Applicant: HYUNDAI MOBIS CO., LTD., Seoul (KR)

(72) Inventor: Choong Sik Shin, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 545 days.

(21) Appl. No.: 17/948,315

(22) Filed: Sep. 20, 2022

(65) Prior Publication Data

US 2023/0146380 A1    May 11, 2023

(30) Foreign Application Priority Data

Nov. 5, 2021    (KR) .................. 10-2021-0151159

(51) Int. Cl.

| | |
|---|---|
| *F16D 66/00* | (2006.01) |
| *B60T 8/171* | (2006.01) |
| *B60T 13/74* | (2006.01) |
| *B60T 17/22* | (2006.01) |
| *F16D 65/18* | (2006.01) |
| *G01L 5/12* | (2006.01) |
| *B60T 1/06* | (2006.01) |
| *F16D 55/226* | (2006.01) |
| *F16D 121/24* | (2012.01) |

(Continued)

(52) U.S. Cl.
CPC ............ *B60T 13/746* (2013.01); *B60T 8/171* (2013.01); *B60T 17/22* (2013.01); *F16D 65/18* (2013.01); *F16D 66/00* (2013.01); *G01L 5/12* (2013.01); *B60T 1/065* (2013.01); *F16D 55/226* (2013.01); *F16D 2066/005* (2013.01); *F16D 2121/24* (2013.01); *F16D 2125/40* (2013.01); *F16D 2125/48* (2013.01)

(58) Field of Classification Search
CPC .............. F16D 65/18; F16D 2066/005; F16D 2500/3023; F16D 2125/48; B60T 13/741; B60T 13/746; B60T 8/171; B60T 17/22; G01L 5/12

See application file for complete search history.

(56) References Cited

U.S. PATENT DOCUMENTS 6,907,967 B1 *   6/2005   Kapaan .................... H02K 7/06
                                                                      188/162
2016/0244042 A1 *   8/2016   Nishikawa .............. F16D 65/18

FOREIGN PATENT DOCUMENTS

KR       10-0456779 B1    11/2004
WO    WO-2005059395 A1 *  6/2005   ............ B60T 13/741

OTHER PUBLICATIONS

Machine translation of WO-2005059395 (no date).*

* cited by examiner

*Primary Examiner* — Nicholas J Lane
(74) *Attorney, Agent, or Firm* — Novo TechIP International PLLC

(57) ABSTRACT

Proposed is a vehicle brake apparatus including a motor unit configured to generate motive power with received external electrical power, a driveline unit provided with a reduction gear unit that is rotated by drive of the motor unit and reduces the motive power of the motor unit and a bearing that supports rotation of the reduction gear unit, a cylinder unit configured to press a brake pad with the motive power received from the driveline unit, a load sensing unit configured to sense a load produced from axial force of the reduction gear unit, and a housing unit connected to the motor unit and having the driveline unit and the load sensing unit installed therein.

4 Claims, 15 Drawing Sheets

(51) Int. Cl.
*F16D 125/40* (2012.01)
*F16D 125/48* (2012.01)

VEHICLE BRAKE APPARATUS

CROSS-REFERENCE TO RELATED APPLICATIONS

This application claims the benefit of priority under 35 USC § 119(a) to Korean Patent Applications No. 10-2021-0151159, filed on Nov. 5, 2021, the entire disclosure of which is incorporated herein by reference for all purposes.

TECHNICAL FIELD

Exemplary embodiments of the present disclosure relate to a vehicle brake apparatus, and more particularly, to a vehicle brake apparatus, which can have a reduced weight and reduced overall size in an automotive electronic component thereof, compared to the related art, in a case where a load sensor is applied thereto.

BACKGROUND

Generally, an electro-mechanical brake (EMB) is a system that generates braking force in a manner that converts a driver's stepping force on a brake pedal into an electrical signal and operates a motor mounted on a caliper, unlike a hydraulic brake system of the related art. Motive power of the motor is transmitted to a piston unit by a driveline unit, and then the piston unit is operated. Thus, a brake pad presses a brake disc in a manner that is brought into contact with the brake disc. In this case, a load sensor is connected to the piston unit for being combined therewith.

However, as the size of the piston unit varies with vehicle types, the size of the load sensor increases rapidly. Thus, there occurs a problem in that the weight of the EMB is increased and the overall size of the automotive electronic component becomes bigger. Accordingly, there is a need to solve the above problem.

The background technology of the disclosure is disclosed in Korean Patent No. 10-0456779 registered on Nov. 2, 2004, and entitled "Vehicle Brake Apparatus".

SUMMARY

Various embodiments are directed to a vehicle brake apparatus, which can have a reduced weight and reduced overall size in an automotive electronic component thereof, compared to the related art, in a case where a load sensor is applied thereto.

In an embodiment, to achieve the objects, a vehicle brake apparatus includes: a motor unit configured to generate motive power with received external electrical power; a driveline unit provided with a reduction gear unit that is rotated by drive of the motor unit and reduces the motive power of the motor unit and a bearing that supports rotation of the reduction gear unit; a cylinder unit configured to press a brake pad with the motive power received from the driveline unit; a load sensing unit configured to sense a load produced from axial force of the reduction gear unit; and a housing unit connected to the motor unit and having the driveline unit and the load sensing unit installed therein.

In an embodiment, the vehicle brake apparatus may include a control unit configured to receive sensing information from the load sensing unit and output braking force produced between the brake pad and a brake disc based on the sensing information.

In an embodiment, the reduction gear unit may include: a first reduction gear engaged with a driving gear of the motor unit for being combined therewith and rotated with rotational force received from the driving gear; a second reduction gear connected to the first reduction gear and configured to receive rotational force from the first reduction gear; a third reduction gear engaged with the second reduction gear for being combined therewith and configured to receive rotational force from the second reduction gear; a fourth reduction gear connected to the third reduction gear and configured to receive rotational force from the third reduction gear; and a fifth reduction gear connected to the cylinder unit and supported by the bearing for being rotated, wherein the load sensing unit senses the load produced from axial force of the fifth reduction gear.

In an embodiment, the fifth reduction gear may include: a shaft connected to the cylinder unit, having the bearing mounted thereon, and brought into contact with the load sensing unit; and a fifth reduction body gear connected to the shaft and engaged with the fourth reduction gear for being combined therewith.

In an embodiment, the load sensing unit may include a load cell, is arranged in parallel to the bearing, and is brought into contact with the shaft in an axial direction.

In an embodiment, the load sensing unit may include: an elastic member configured to support the bearing elastically; a magnet installed in the bearing and having a position varied by elastic force of the elastic member; and a position sensor installed in the housing unit, and configured to determine a position of the magnet by sensing a magnetic field of the magnet, and to sense a load according to the axial force of the fifth reduction gear based on the position of the magnet.

In an embodiment, the bearing comprises: a bearing inner ring configured to surround the shaft of the fifth reduction gear; a bearing outer ring configured to surround an outer side of the bearing inner ring, having the magnet installed therein, and supported elastically by the elastic member; and a plurality of balls arranged between the bearing inner ring and the bearing outer ring.

In an embodiment, the cylinder unit comprises: a screw bar connected to the fifth reduction gear and pivoted with rotational force received from the fifth reduction gear; a spindle configured to surround an outer side of the screw bar and moved toward the brake pad while being rotated by rotational force of the screw bar; and a cylinder configured to surround the spindle and press the brake pad by being moved in conjunction with the spindle.

In the vehicle brake apparatus according to the present disclosure, the load sensing unit is arranged on the reduction gear unit in such a manner as to sense the load produced from the axial force of the reduction gear unit. Therefore, the vehicle brake apparatus according to the present disclosure provides the effect of reducing the weight of the load sensing unit compared to the related art that applies the load sensing unit to the cylinder.

In addition, as the weight of the load sensing unit is reduced, the overall weight of the vehicle brake apparatus can be reduced, and thus the automotive electronic component thereof can decrease, resulting in cost reduction in parts of the apparatus. Furthermore, even for various vehicle types, the weight change of the load sensing part is less than in the related art, resulting in easier layout work in the design.

DETAILED DESCRIPTION

Figure 1:
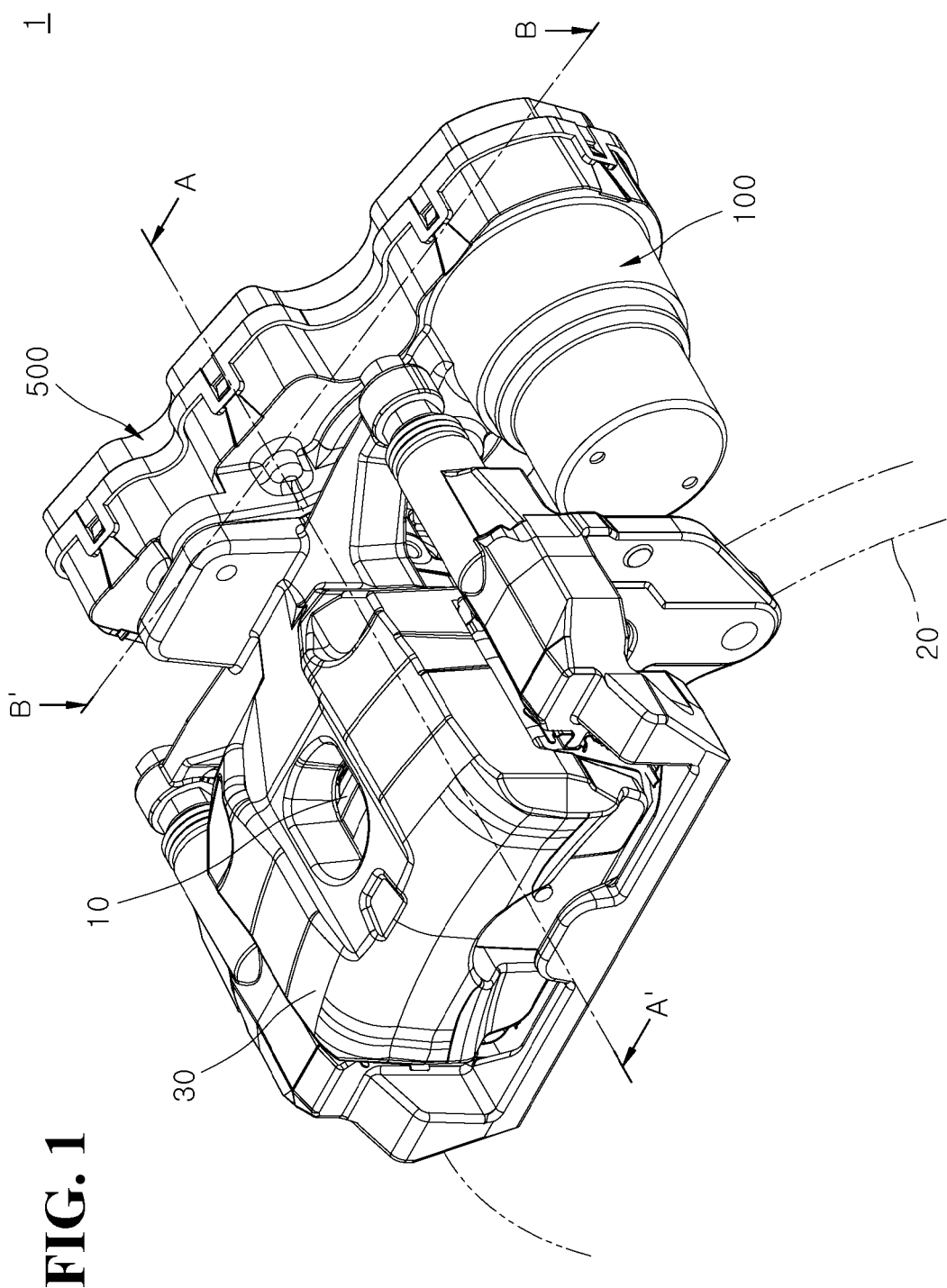
FIG. 1 is a view illustrating a vehicle brake apparatus according to an embodiment of the present disclosure.

Hereinafter, a vehicle brake apparatus will be described with reference to the accompanying drawings through various exemplary embodiments.

In such a process, for clarity and convenience in description, thicknesses of lines, sizes of constituent elements, and the like may be illustrated in an exaggerated manner in the drawings. Further, terms to be described hereinafter have been defined in consideration of functions in the disclosure, and may differ depending on a user or an operator's intention, or practice. Therefore, definitions of these terms should be stated in light of details disclosed throughout the present specification.

Figure 2:
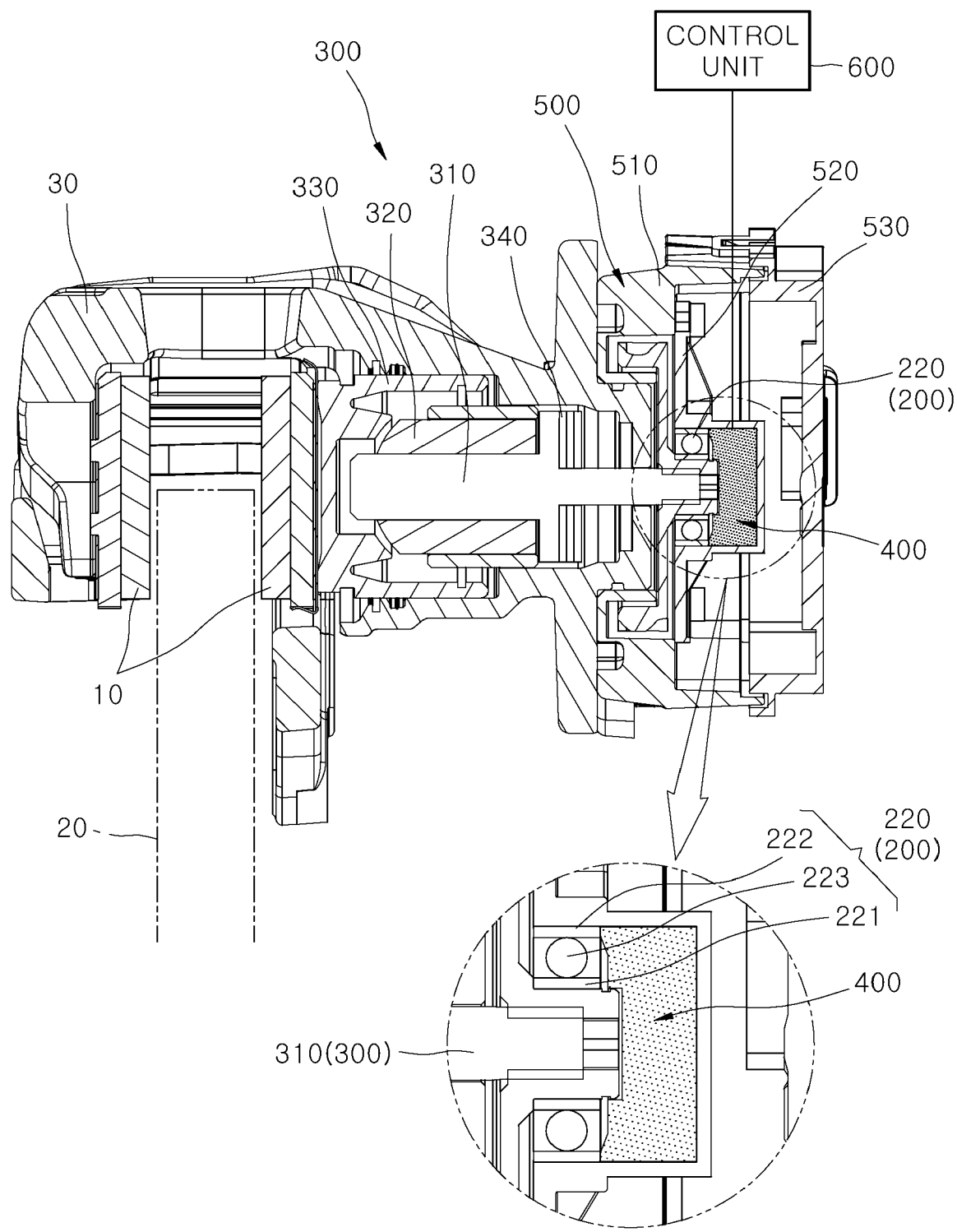
FIG. 2 is a cross-sectional view taken along line A-A' of FIG. 1.
Figure 3:
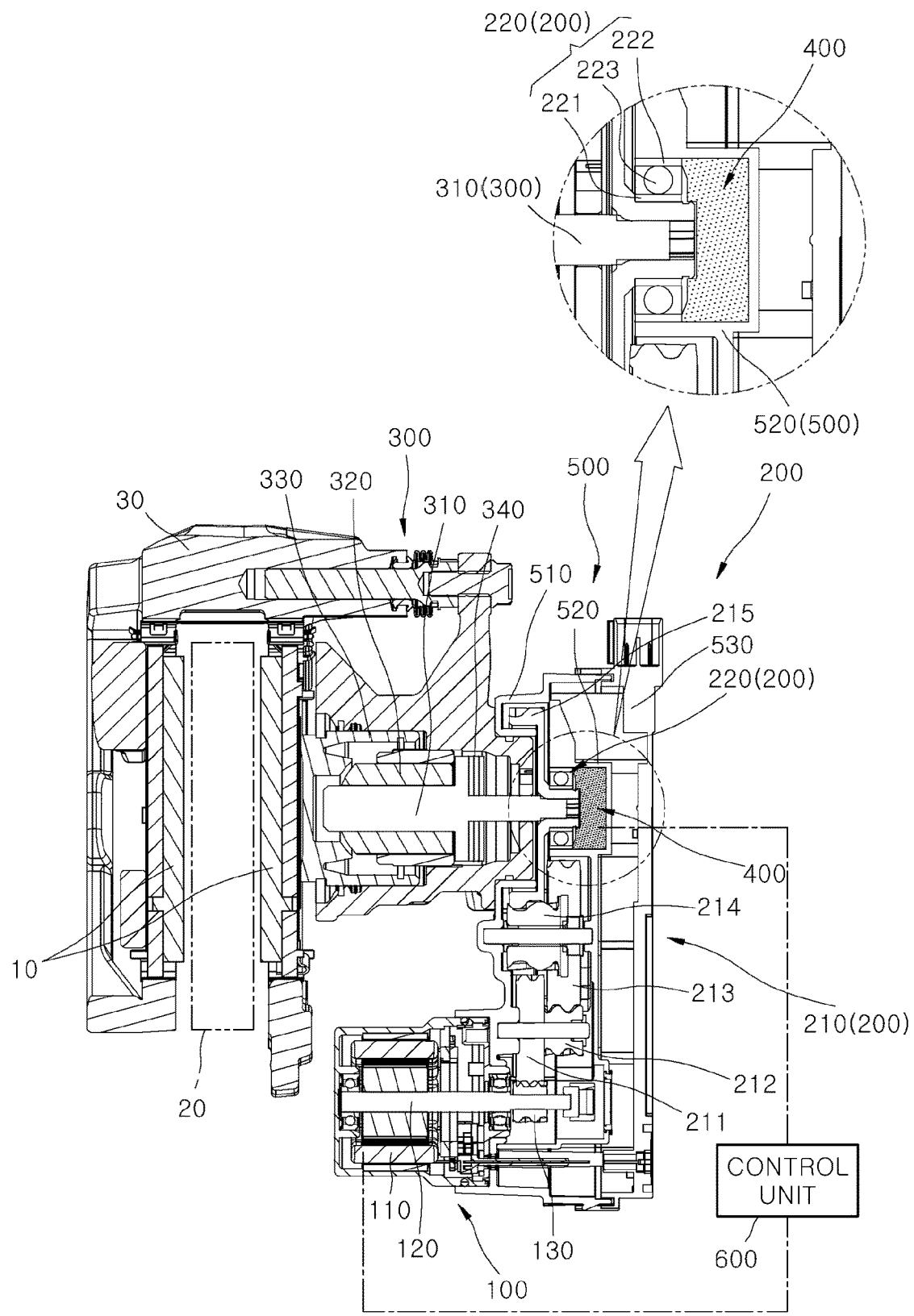
FIG. 3 is a cross-sectional view taken along line B-B' of FIG. 1.
Figure 4:
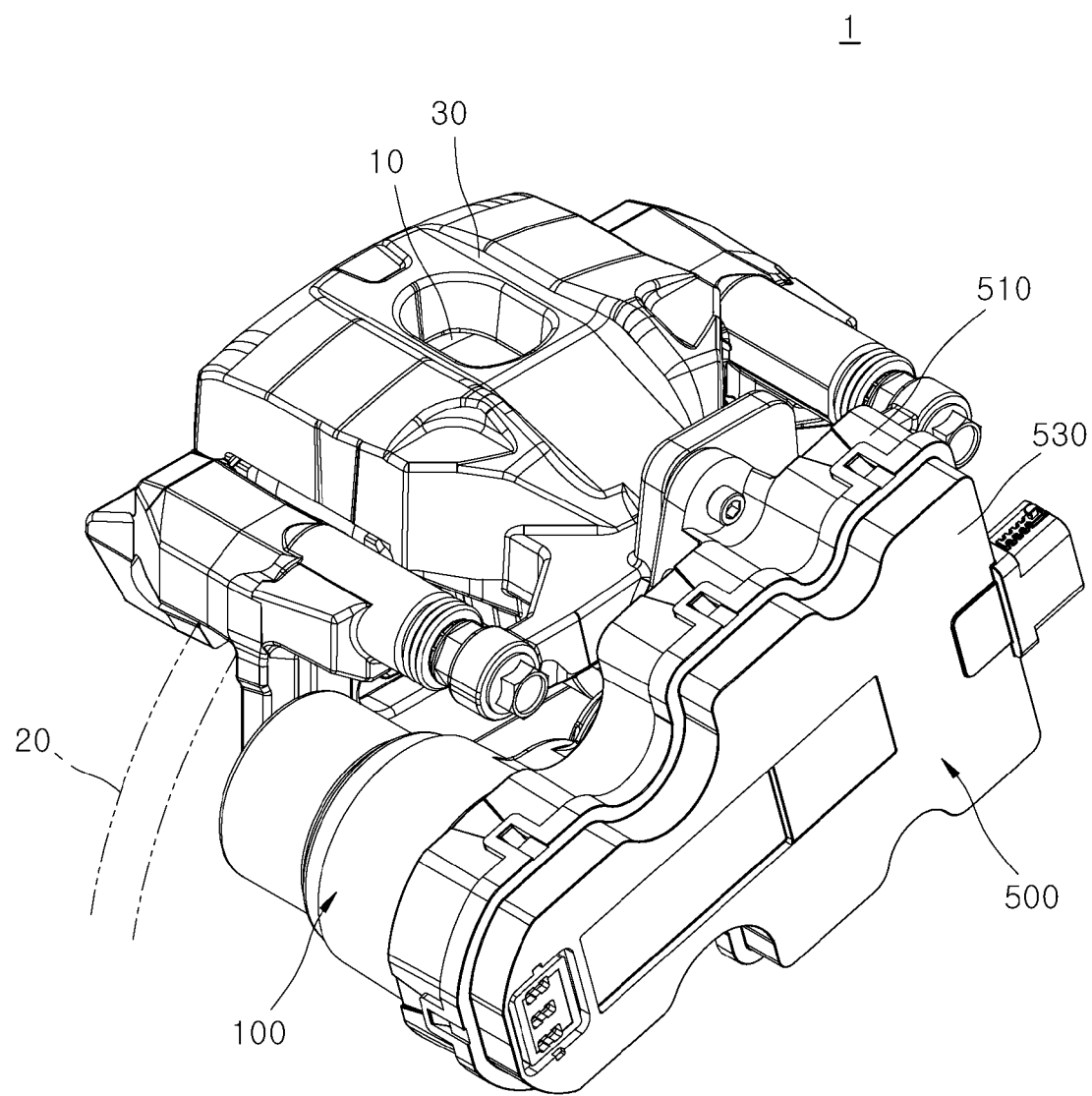
FIG. 4 is a view of the vehicle brake apparatus according to the embodiment of the present disclosure when viewed from another direction.
Figure 5:
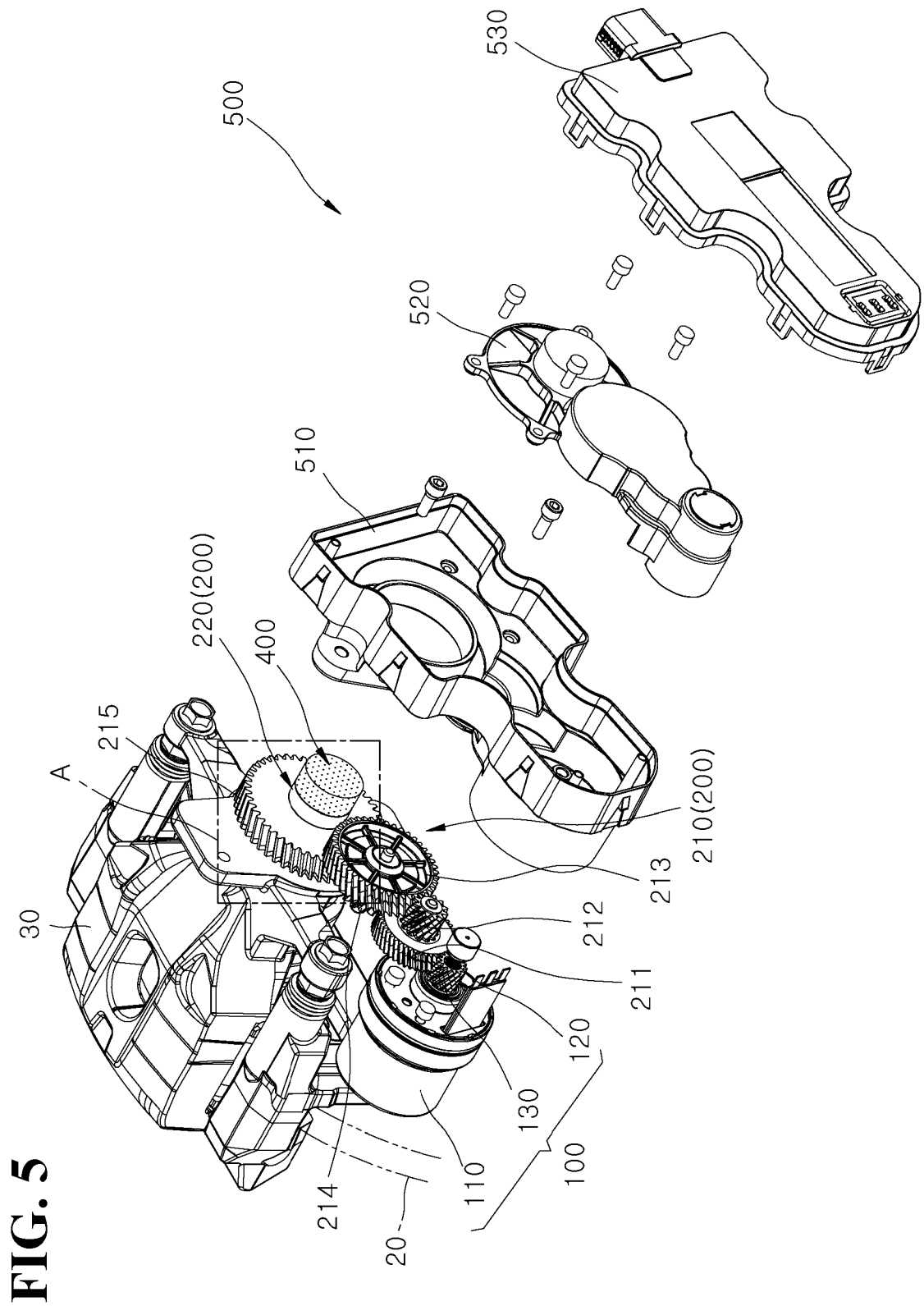
FIG. 5 is a partially exploded perspective view of FIG. 4.
Figure 6:
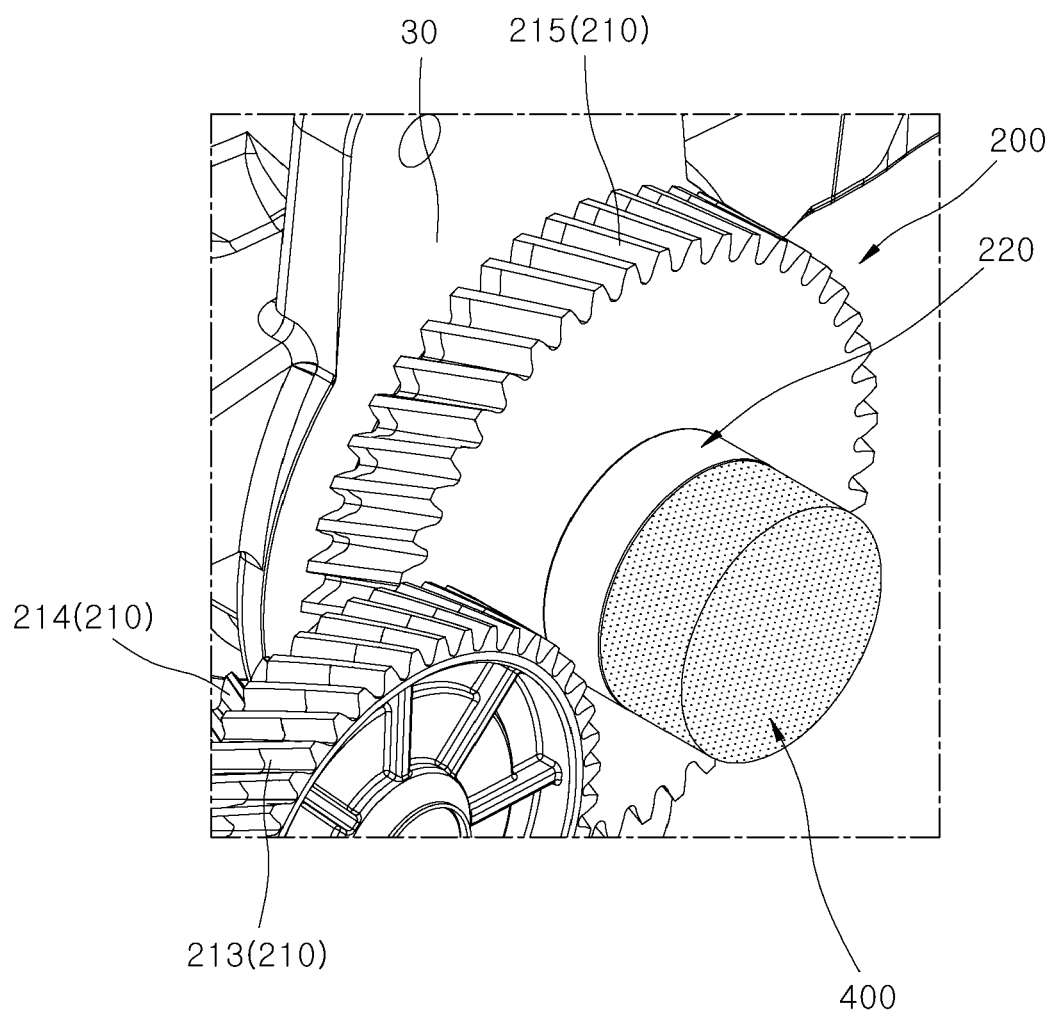
FIG. 6 is an enlarged view of a portion A of FIG. 5.
Figure 7:
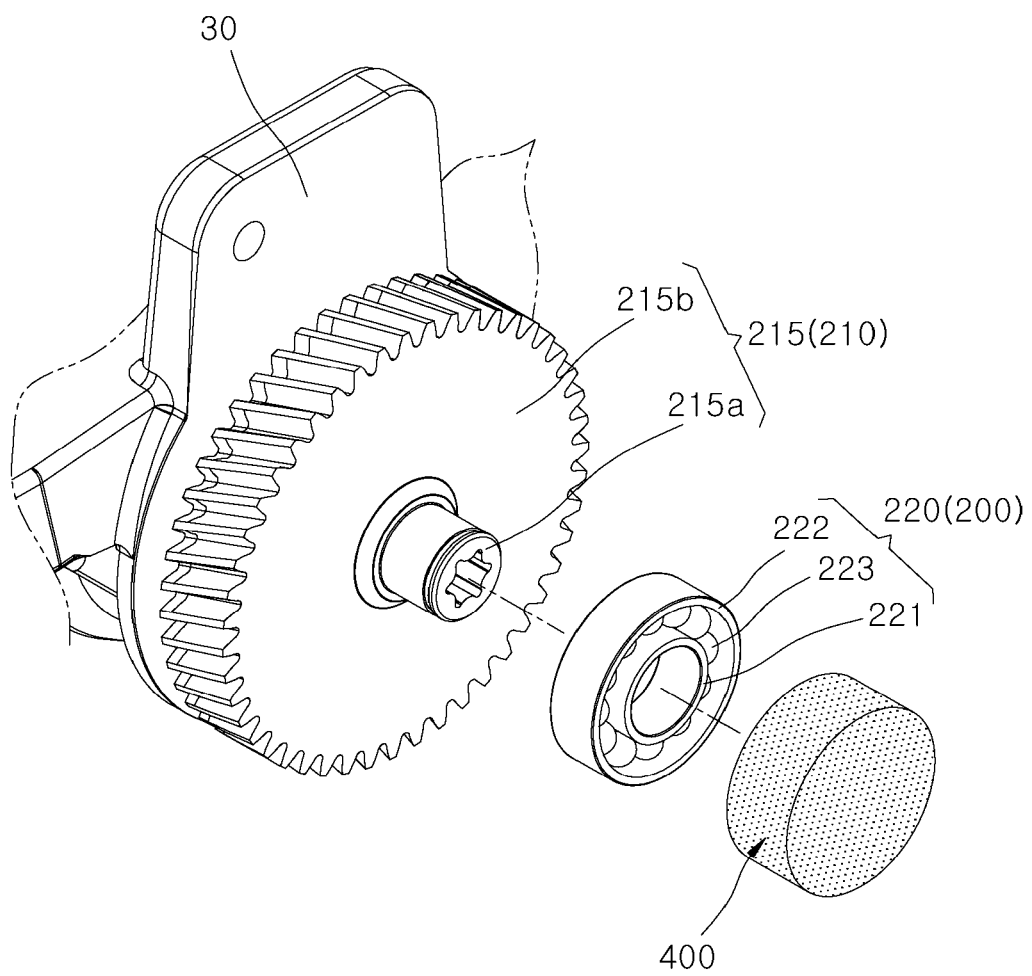
FIG. 7 is an exploded perspective view of FIG. 6.

FIG. 1 is a view illustrating a vehicle brake apparatus according to an embodiment of the present disclosure, FIG. 2 is a cross-sectional view taken along the line A-A' of FIG. 1, FIG. 3 is a cross-sectional view taken along the line B-B' of FIG. 1, FIG. 4 is a view illustrating the vehicle brake apparatus according to the embodiment of the present disclosure when viewed from another direction, FIG. 5 is a partially exploded perspective view of FIG. 4, FIG. 6 is an enlarged view of a portion A of FIG. 5, and FIG. 7 is an exploded perspective view of FIG. 6.

Referring to FIGS. 1 to 7, a vehicle brake apparatus 1 according to the embodiment of the present disclosure includes a motor unit 100, a driveline unit 200, a cylinder unit 300, a load sensing unit 400, and a housing unit 500. The motor unit 100 generates motive power with electrical power supplied thereto. In this case, the motive power generated from the motor unit 100 is transmitted to the driveline unit 200.

The motor unit 100 includes a motor main body 110, a motor shaft part 120, and a driving gear 130. The motive power is generated from the motor main body 110. The motor shaft part 120 is connected to the motor main body 110 and rotated by the motive power of the motor main body 110. The driving gear 130 is installed on the motor shaft part 120 and rotated in conjunction with the motor shaft part 120.

The driveline unit 200 is provided with a reduction gear unit 210 and a bearing 220. The reduction gear unit 210 is rotated by the drive of the motor unit 100 and reduces the motive power of the motor unit 100.

The bearing 220 supports the rotation of the reduction gear unit 210. In this case, the bearing 220 supports the rotation of a fifth reduction gear 215 of the reduction gear unit 210.

The cylinder unit 300 presses a brake pad 10 with the motive power received from the driveline unit 200. The cylinder unit 300 is connected to the reduction gear unit 210 of the driveline unit 200 but receives the reduced motive power from the reduction gear unit 210.

The cylinder unit 300 is installed in a caliper body 30 and includes a screw bar 310, a spindle 320, and a cylinder 330. The screw bar 310 is connected to the fifth reduction gear 215 of the reduction gear unit 210 and pivots with a rotational force received from the fifth reduction gear 215. The screw bar 310 is inserted into the spindle 320 described below in a rod shape and is provided with a male screw thread (not illustrated) formed on the outer side thereof.

The spindle 320 surrounds the screw bar 310 and is moved toward the brake pad 10 in a manner that is rotated by the rotational force of the screw bar 310. A female screw thread (not illustrated) is formed on the inner side of the spindle 320, and the female screw thread is engaged with the male screw thread of the screw bar 310 for being combined therewith.

Specifically, in a case where the screw bar 310 is rotated in a predetermined direction, the spindle 320 is moved toward the brake pad 10 in a manner that converts a rotary motion of the screw bar 310 into a straight line motion. Conversely, in a case where the screw bar 310 is rotated in an opposite direction from the predetermined direction, the spindle 320 is moved toward the opposite side of the brake pad 10.

The cylinder 330 surrounds the spindle 320 and presses the brake pad 10 in a manner that is moved in conjunction with the spindle 320. The cylinder 330 is, in a shape of surrounding the spindle 320, moved with the spindle 320 toward the brake pad 10 or toward the opposite side of the brake pad 10 by the pressurization of the spindle 320.

The load sensing unit 400 senses a load produced from an axial force of the reduction gear unit 210. The load sensing unit 400 may be mounted on the housing unit 500 in such a manner as to be in contact with the reduction gear unit 210 in an axial direction. In this case, the axial force is proportional to the braking force produced between the brake pad 10 and a brake disc 20.

The housing unit 500 is connected to the motor unit 100, and houses the driveline unit 200 and the load sensing unit 400. The housing unit 500 includes a first housing 510, a second housing 520, and a third housing 530. The first housing 510 is combined with the motor unit 100. The second housing 520 is combined with the first housing 510, and the driveline unit 200 and the load sensing unit 400 are installed therein. The third housing 530 is combined with the first housing 510.

A control unit 600 receives sensing information from the load sensing unit 400 and outputs the braking force produced between the brake pad 10 and the brake disc 20 based on the sensing information. Based on the sensing information received from the load sensing unit 400, the control unit 600 may output and show braking force on a display (not illustrated) in the form of a character or the like to be recognized by an operator, the braking force being produced between the brake pad 10 and the brake disc 20. The control unit 600 controls the operation of the motor unit 100.

The reduction gear unit 210 includes a first reduction gear 211, a second reduction gear 212, a third reduction gear 213, a fourth reduction gear 214, and the fifth reduction gear 215. The first reduction gear 211 is engaged with the driving gear 130 of the motor unit 100 for being combined therewith. The first reduction gear 211 is rotated with the rotational force received from the driving gear 130. The second reduction gear 212 is connected to the first reduction gear 211 and receives the rotational force from the first reduction gear 211. The third reduction gear 213 is engaged with the second reduction gear 212 for being combined therewith and receives the rotational force from the second reduction gear 212. The fourth reduction gear 214 is connected to the third reduction gear 213 and receives the rotational force from the third reduction gear 213. The fifth reduction gear 215 is connected to the cylinder unit 300 and is supported by the bearing 220 for being rotated. The load sensing unit 400 is mounted on the fifth reduction gear 215, and the load sensing unit 400 senses the load produced from the axial force of the fifth reduction gear 215.

The reduction gear unit 210 is illustrated with five gears including the first reduction gear 211, the second reduction gear 212, the third reduction gear 213, the fourth reduction gear 214, and the fifth reduction gear 215, but is not limited thereto. The number of gears thereof is changeable for different cases, e.g., three gears or the like.

In this case, the load sensing unit 400 may be arranged at any one of the gears constituting the reduction gear unit 210 in an axial direction. The load sensing unit 400 may be mounted on the gear of the reduction gear unit 210, which is connected to the screw bar 310 of the cylinder unit 300.

The fifth reduction gear 215 includes a shaft 215A and a fifth reduction gear body 215B. The shaft 215A is connected to the screw bar 310 of the cylinder unit 300, and the bearing 220 is disposed or mounted thereon.

The load sensing unit 400 senses the load produced from the axial force of the fifth reduction gear 215. The load sensing unit 400 includes a load cell, arranged in parallel to the bearing 220, and is in contact with the shaft 215A. Thus, the load sensing unit 400 may sense the load produced from the axial force of the fifth reduction gear 215.

Figure 8:
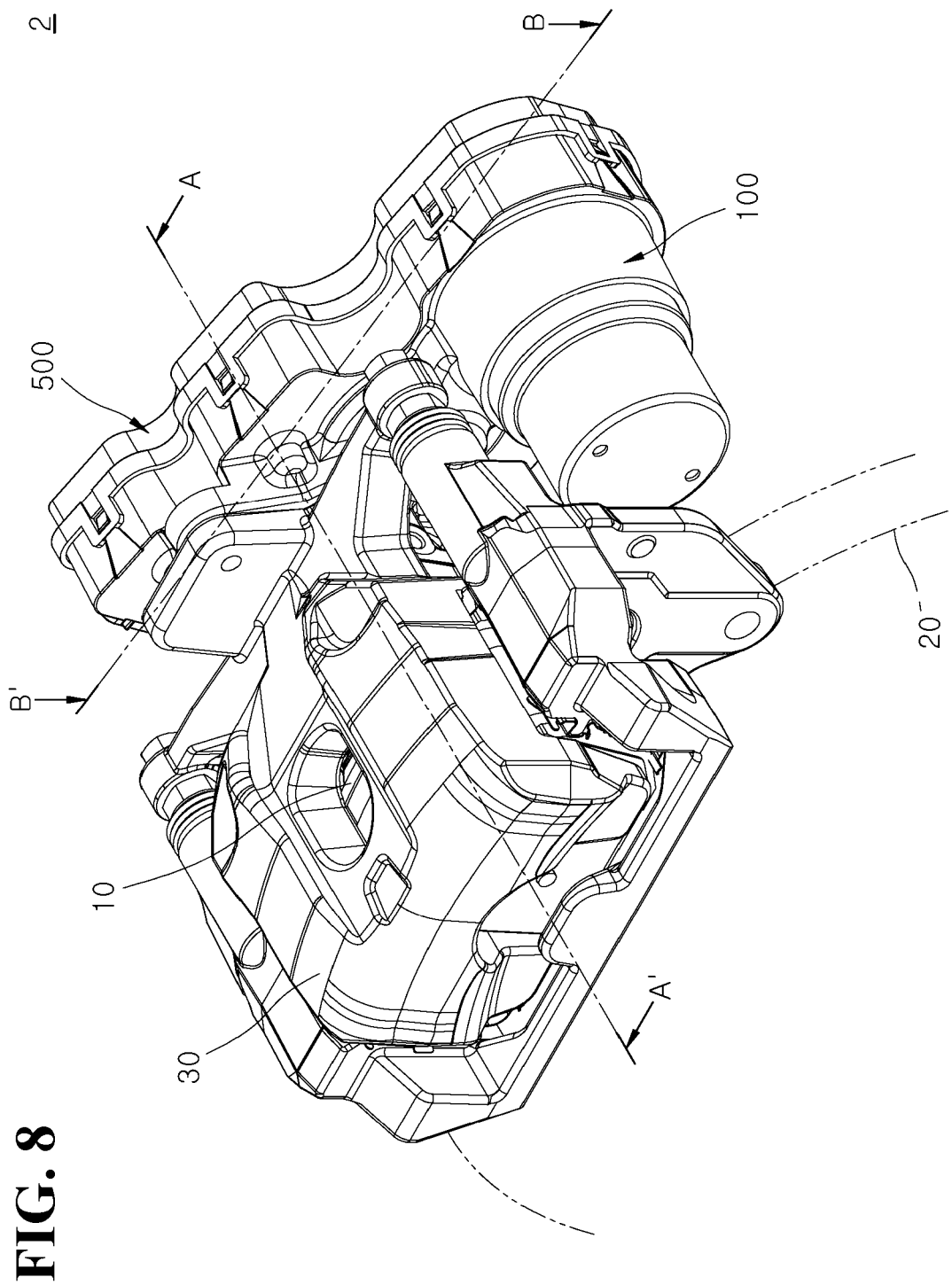
FIG. 8 is a view illustrating a vehicle brake apparatus according to another embodiment of the present disclosure.
Figure 9:
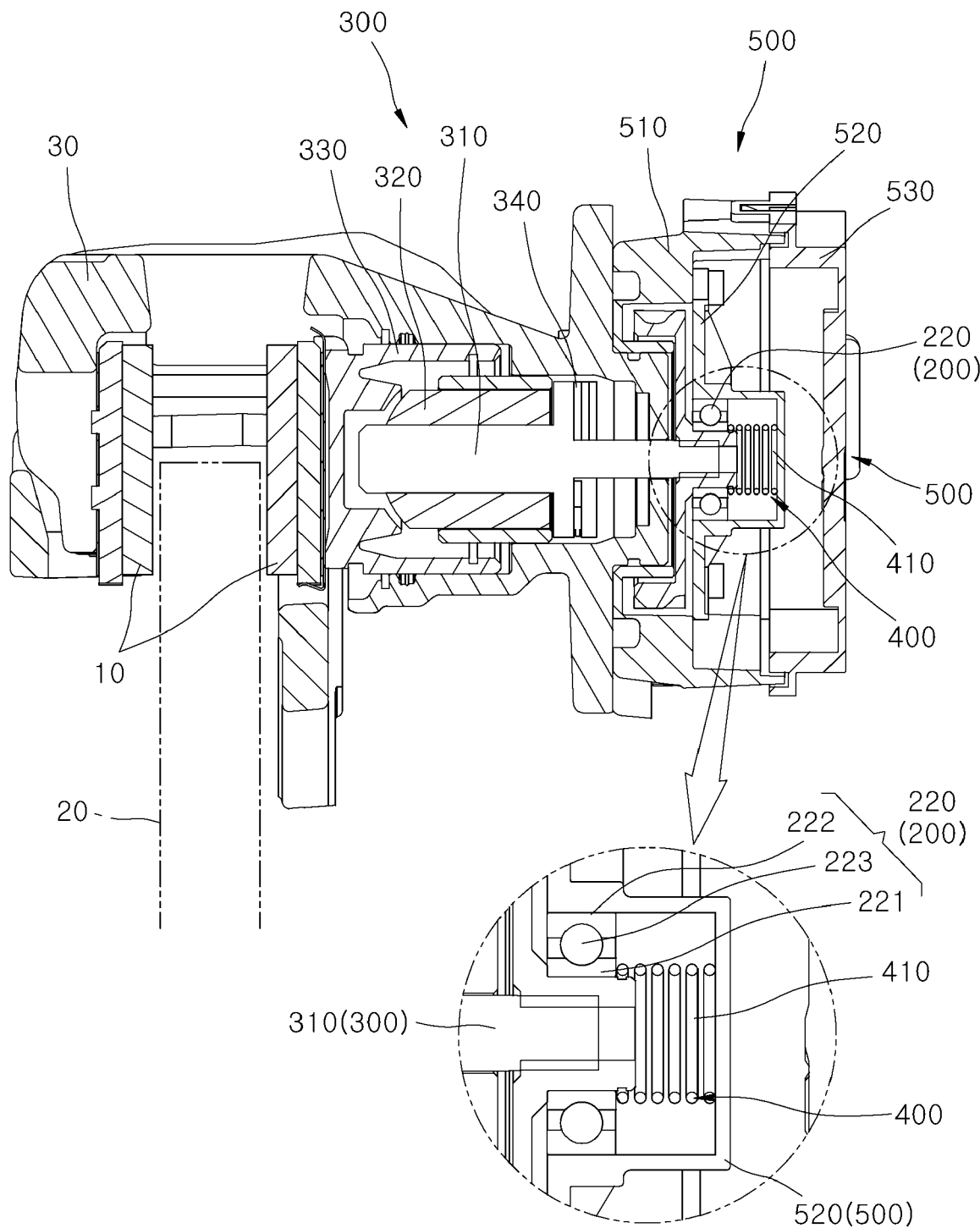
FIG. 9 is a cross-sectional view taken along line A-A' of FIG. 8.
Figure 10:
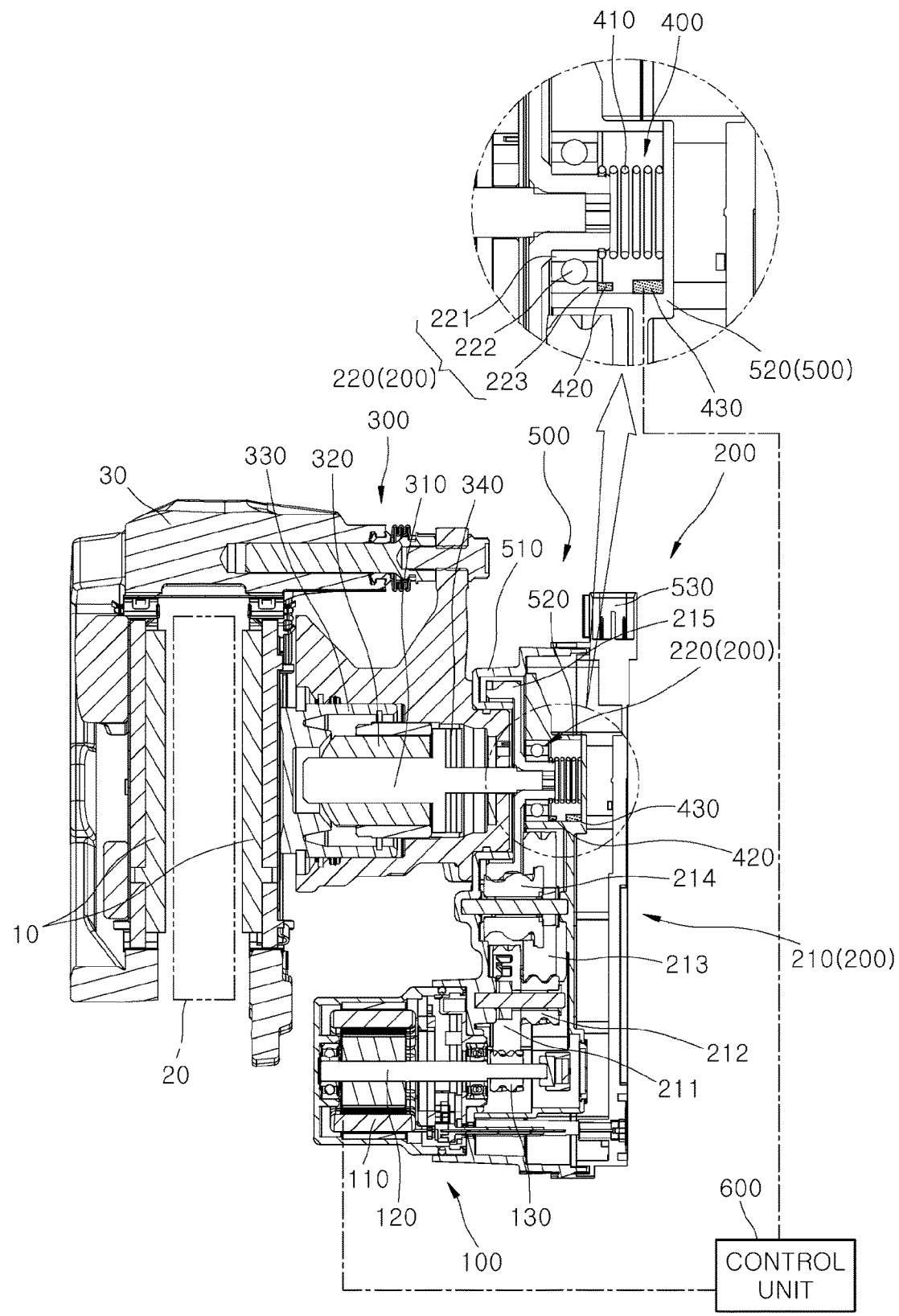
FIG. 10 is a cross-sectional view taken along line B-B' of FIG. 8.
Figure 11:
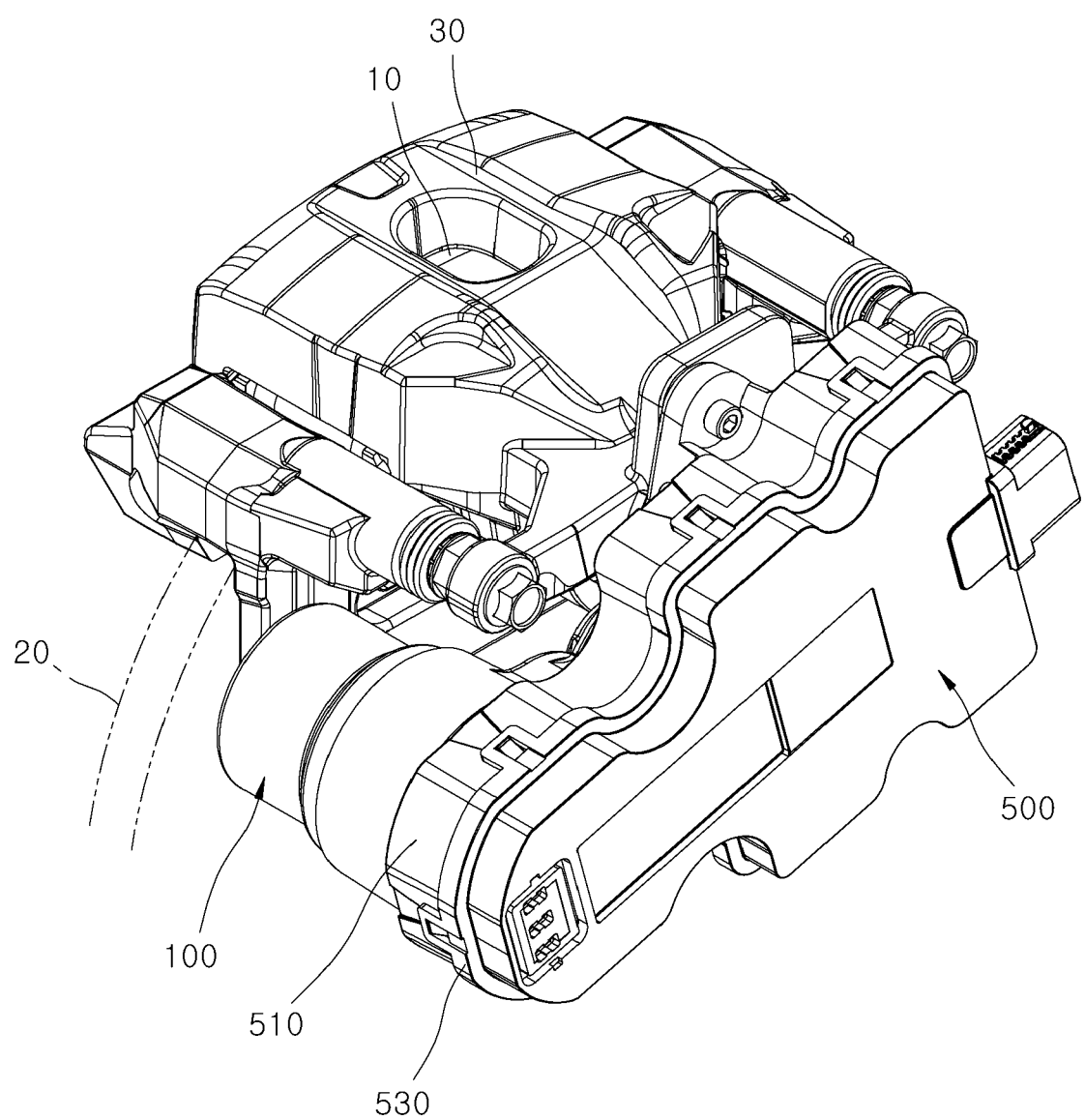
FIG. 11 is a view of the vehicle brake apparatus according to another embodiment of the present disclosure when viewed from another direction.
Figure 12:
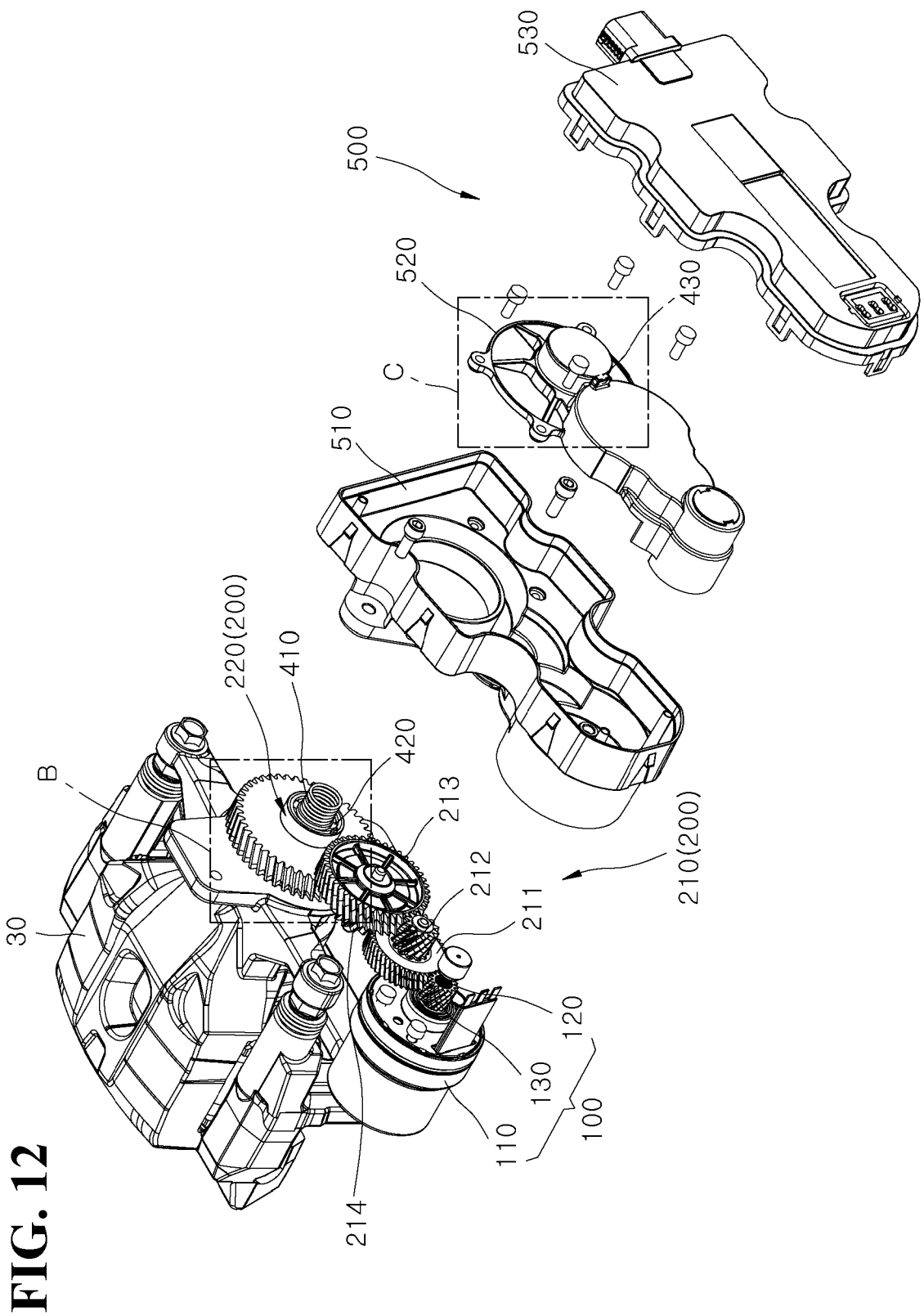
FIG. 12 is a partially exploded perspective view of FIG. 11.
Figure 13:
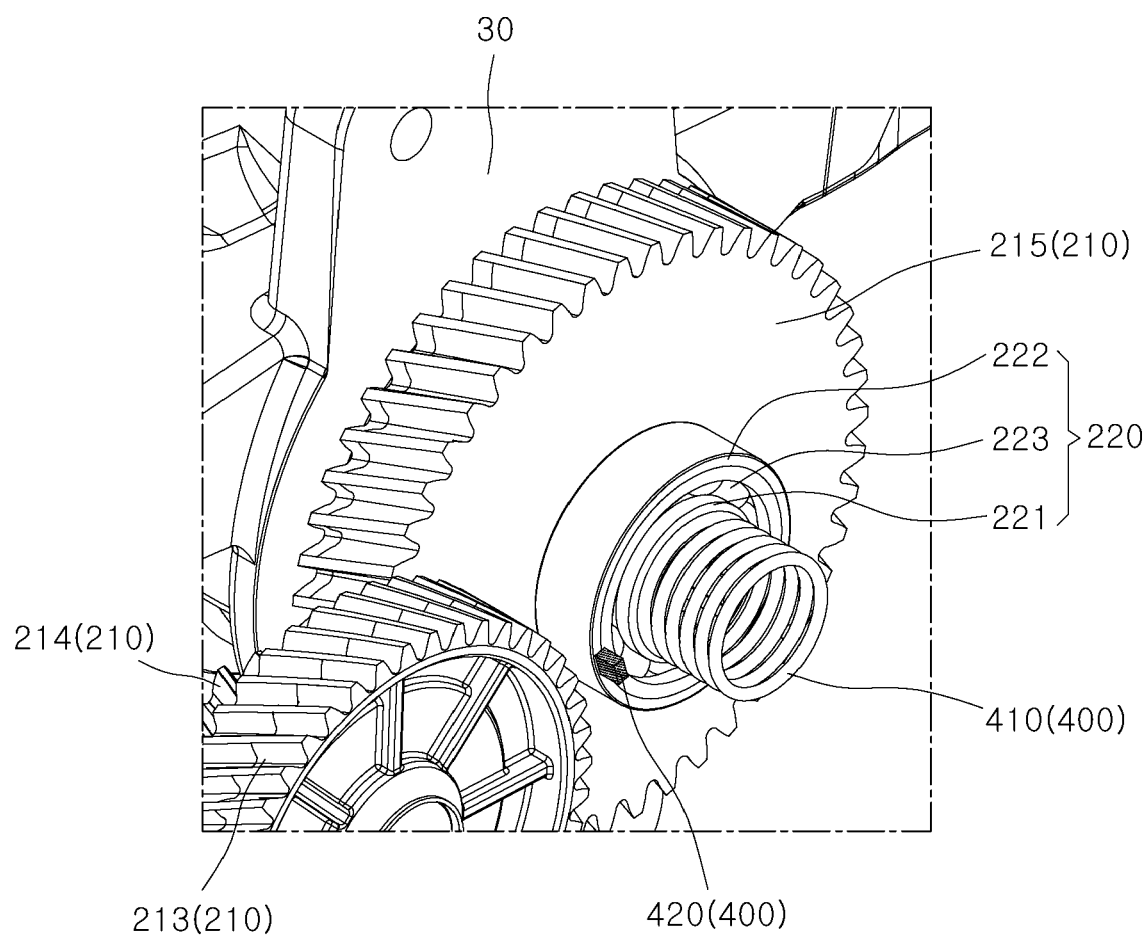
FIG. 13 is an enlarged view of a portion B of FIG. 12.
Figure 14:
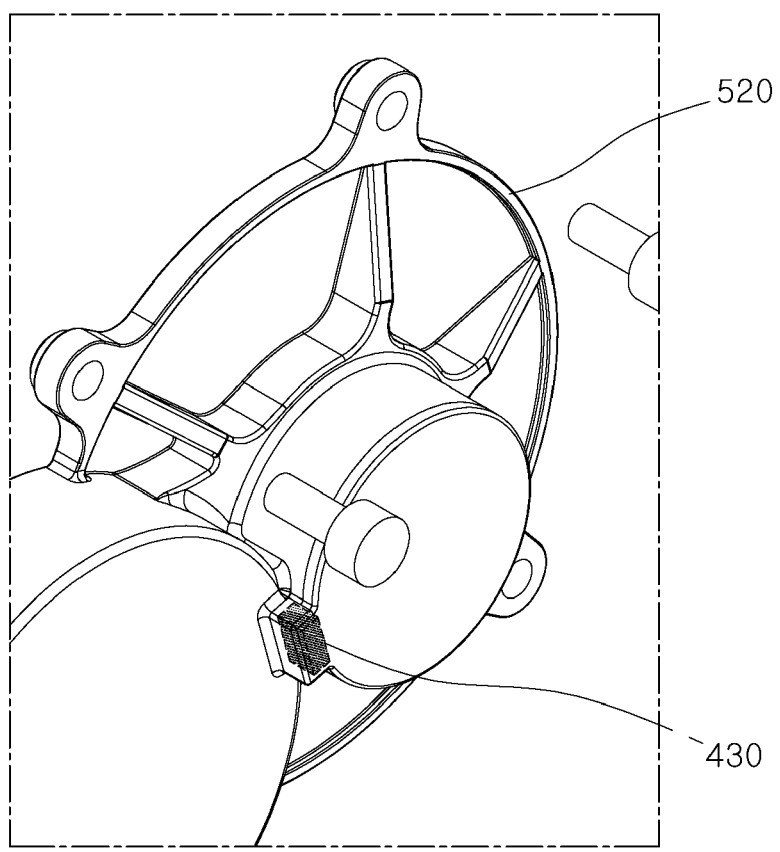
FIG. 14 is an enlarged view of a portion C of FIG. 12.
Figure 15:
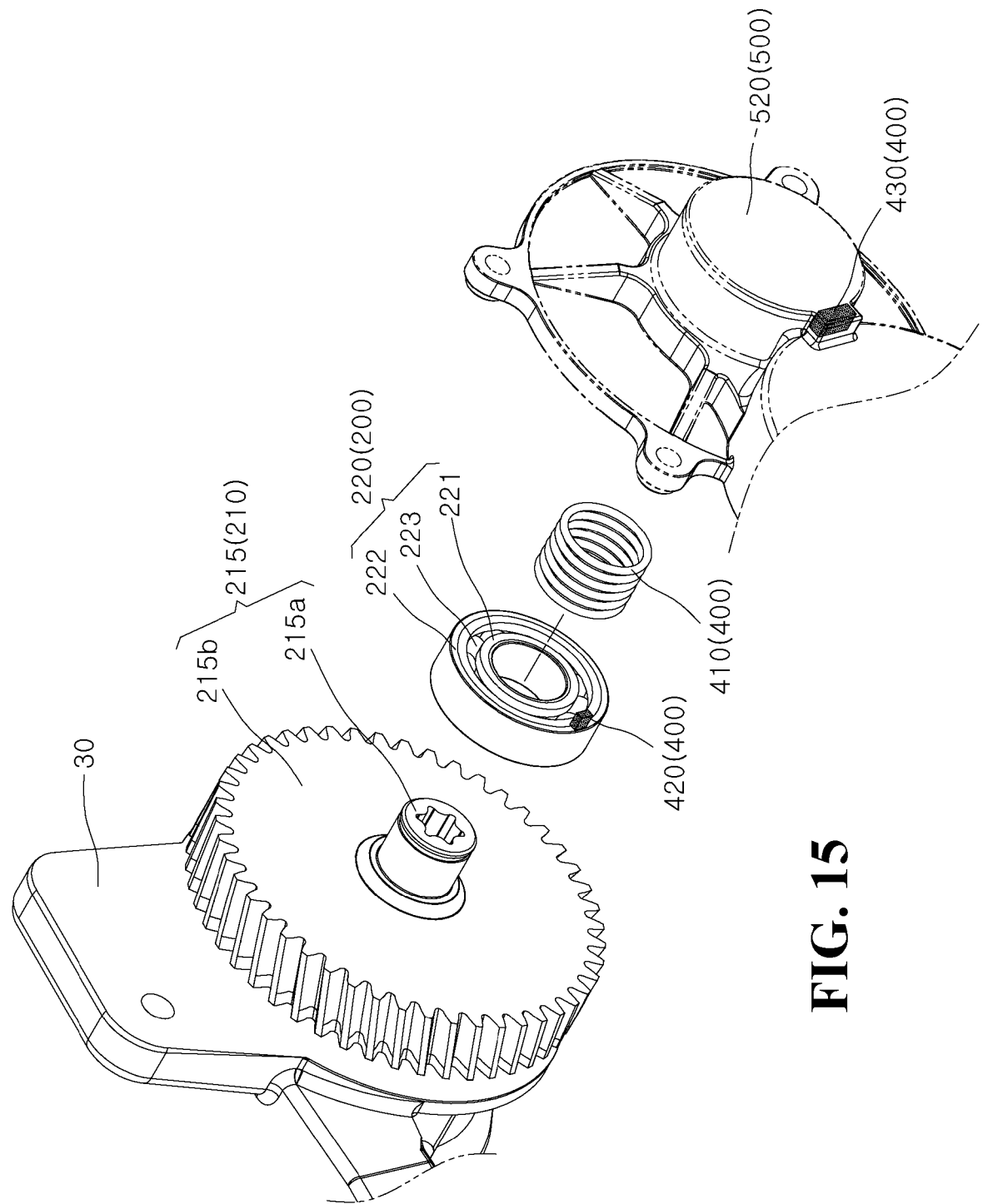
FIG. 15 is an exploded perspective view of main components of FIG. 12.

FIG. 8 is a view illustrating a vehicle brake apparatus according to another embodiment of the present disclosure, FIG. 9 is a cross-sectional view taken along the line A-A' of FIG. 8, FIG. 10 is a cross-sectional view taken along the line B-B' of FIG. 8, FIG. 11 is a view illustrating the vehicle brake apparatus according to the another embodiment of the present disclosure when viewed from another direction, FIG. 12 is a partially exploded perspective view of FIG. 11, FIG. 13 is an enlarged view of a portion B of FIG. 12, FIG. 14 is an enlarged view of a portion C of FIG. 12, and FIG. 15 is an exploded perspective view of main components of FIG. 12.

Hereinafter, the vehicle brake apparatus according to another embodiment of the present disclosure will be described. Detailed descriptions of another embodiment for the same contents as in the embodiment of the present disclosure are omitted.

Referring to FIGS. 8 to 15, the load sensing unit 400 in a vehicle brake apparatus 2 according to another embodiment of the present disclosure includes an elastic member 410, a magnet 420, and a position sensor 430. The elastic member 410 elastically supports the bearing 220.

The magnet 420 is installed in the bearing 220, and the position of the magnet 420 is varied by an elastic force of the elastic member 410.

The position sensor 430 is installed in the housing unit 500, determines the position of the magnet 420 by sensing a magnetic field of the magnet 420, and senses the load according to the axial force of the fifth reduction gear 215 based on the position of the magnet 420.

The control unit 600 receives sensing information from the position sensor 430 of the load sensing unit 400 and outputs the braking force produced between the brake pad 10 and the brake disc 20 based on the sensing information. Based on the sensing information received from the position sensor 430 of the load sensing unit 400, the control unit 600 may output and show the braking force on a display (not illustrated) in the form of a character or the like to be recognized by an operator, the braking force being produced between the brake pad 10 and the brake disc 20.

The bearing 220 includes a bearing inner ring 221, a bearing outer ring 222, and a plurality of balls 223. The bearing inner ring 221 surrounds the shaft 215A of the fifth reduction gear 215. The bearing inner ring 221 supports the rotation of the fifth reduction gear 215. The bearing outer ring 222 surrounds the bearing inner ring 221, is provided with the magnet 420 installed therein, and is elastically supported by the elastic member 410. The plurality of balls 223 is disposed or arranged between the bearing inner ring 221 and the bearing outer ring 222.

In this way, the load sensing unit 400 is arranged on the reduction gear unit 210 in such a manner as to sense the load produced from the axial force of the reduction gear unit 210, and thus the weight of the load sensing unit 400 is reduced compared to the related art that applies the load sensing unit to the cylinder. That is, the weight of the load sensing unit is from 40 KN to 60 KN in the related art, whereas the weight of the load sensing unit 400 according to the present disclosure may be under 1 KN which is reduced by at least one fortieth from the weight in the related art.

As the weight of the load sensing unit 400 is reduced, the overall weight of the vehicle brake apparatus 1 can be reduced, and thus an automotive electronic component thereof can decrease, resulting in cost reduction in parts of the apparatus. Furthermore, even for various vehicle types, the weight change of the load sensing part 400 is less than in the related art, resulting in easier layout work in designing.

The present disclosure has been described with reference to the exemplary embodiments illustrated in the drawings, but this is only for illustrative purposes, and those skilled in the art will appreciate that various modifications and other equivalent exemplary embodiments are possible therefrom.

Thus, the true technical scope of the disclosure should be defined by the following claims.

What is claimed is:

1. A vehicle electro-mechanical brake apparatus comprising:
 a motor unit configured to generate motive power when supplied with electrical power;
 a driveline unit including (1) a reduction gear unit including at least one reduction gear configured to be rotated by the motor unit and reduce the motive power of the motor unit, and (2) a bearing configured to support rotation of the reduction gear unit;
 a cylinder unit configured to press a brake pad with the motive power from the driveline unit;
 a load sensing unit configured to sense a load produced from an axial force of the reduction gear unit; and
 a housing unit connected to the motor unit and configured to house the driveline unit and the load sensing unit, wherein:

the at least one reduction gear includes a shaft connected to the cylinder unit and configured to contact the load sensing unit, wherein the bearing is disposed on the shaft, and a body connected to the shaft and coupled to be driven by the motor unit to rotate the shaft to drive the cylinder unit in response to motive power generated by the motor unit; and the load sensing unit comprises a load cell, which is arranged in parallel to the bearing, and configured to contact the shaft of the at least one reduction gear to sense a load produced from an axial force of the at least one reduction gear.

2. The vehicle electro-mechanical brake apparatus of claim 1, further comprising a control unit configured to:
receive, from the load sensing unit, sensing information indicative of the sensed load; and
output, based on the sensing information, a braking force produced between the brake pad and a brake disc.

3. A vehicle electro-mechanical brake apparatus comprising:
a motor unit configured to generate motive power when supplied with electrical power;
a driveline unit including (1) a reduction gear unit and (2) a bearing configured to support rotation, wherein the reduction gear unit includes:
a first reduction gear engaged with a driving gear of the motor unit and configured to be rotated by a rotational force received from the driving gear;
a second reduction gear connected to the first reduction gear and configured to receive a rotational force from the first reduction gear;
a third reduction gear engaged with the second reduction gear and configured to receive a rotational force from the second reduction gear;
a fourth reduction gear connected to the third reduction gear and configured to receive a rotational force from the third reduction gear; and
a fifth reduction gear connected to the cylinder unit and supported by the bearing,
wherein the load sensed by the load sensing unit includes a load produced from an axial force of the fifth reduction gear, and
wherein the fifth reduction gear is configured to be rotated by the motor unit and reduce the motive power of the motor unit,
a cylinder unit configured to press a brake pad with the motive power from the driveline unit;
a load sensing unit configured to sense a load produced from an axial force of the reduction gear unit; and
a housing unit connected to the motor unit and configured to house the driveline unit and the load sensing unit, wherein:
the fifth reduction gear includes a shaft connected to the cylinder unit and configured to contact the load sensing unit, wherein the bearing is disposed on the shaft, and a body connected to the shaft and coupled to be driven by the motor unit to rotate the shaft to drive the cylinder unit in response to motive power generated by the motor unit; and the load sensing unit comprises a load cell, which is arranged in parallel to the bearing, and configured to contact the shaft of the at least one reduction gear to sense a load produced from an axial force of the at least one reduction gear.

4. The vehicle electro-mechanical brake apparatus of claim 3, wherein the cylinder unit comprises:
a screw bar connected to the fifth reduction gear and configured to pivot by a rotational force from the fifth reduction gear;
a spindle surrounding the screw bar and configured to be translated upon rotation of the screw bar and move toward the brake pad; and
a cylinder surrounding the spindle and configured to move in conjunction with the spindle and press the brake pad.

* * * * *